Figure 1:
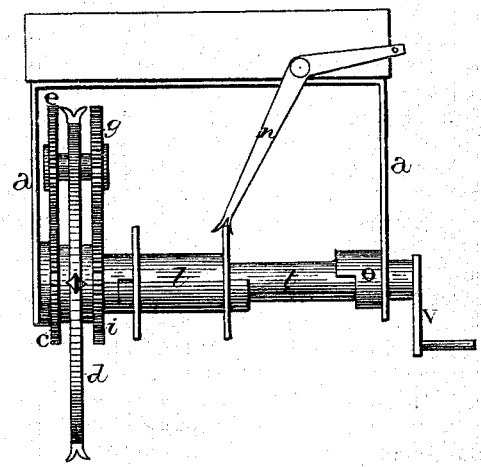
Figure 2:
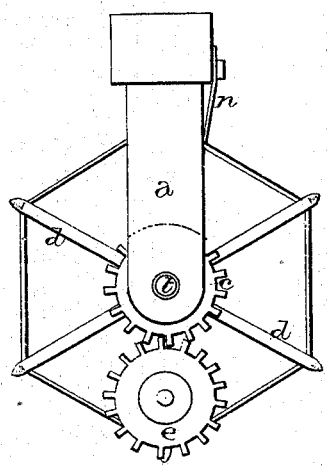

S. REYNOLDS.
Hoisting Machines.

No. 139,614. Patented June 3, 1873.

WITNESSES.
Saml Johnson.
Wm Kendig.

INVENTOR.
Saml Reynolds
per
F. A. Lehmann Atty

UNITED STATES PATENT OFFICE.

SAMUEL REYNOLDS, OF PIERREPONT MANOR, NEW YORK.

IMPROVEMENT IN HOISTING-MACHINES.

Specification forming part of Letters Patent No. 139,614, dated June 3, 1873; application filed May 9, 1873.

*To all whom it may concern:*

Be it known that I, SAMUEL REYNOLDS, of Pierrepont Manor, in the county of Jefferson and State of New York, have invented certain new and useful Improvements in Hoisting-Machines; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in hoisting-machines; and it consists in the arrangement and combination of parts, which will be more fully described hereafter, whereby I am enabled to produce a small and compact machine of great power, and which is especially adapted for use in stores and buildings.

The accompanying drawings represent my invention.

$a$ represents the hangers by which the machine is suspended from the beam above. Permanently secured to one end of this hanger is a cog-wheel, $c$, of any desired size, which meshes with a second one, $e$, of the same size, having its bearings in the large wheel $d$, over which the rope passes, so that it revolves around the fixed one, $c$, as the large wheel is turned by the rope. To the other end of the shaft to which the cog $e$ is secured, and which has its bearings in one of the spokes of the wheel $d$ near its outer end, is another cog-wheel, $g$, having one cog, more or less, than either of the other two, and which meshes with the cog-wheel $i$, having the same number of cogs as the two, $c\ e$. If all four of these wheels had an even number of teeth the wheels $e\ g$ would revolve around the two on the shaft without affecting them in any manner; but by making wheel $g$ with one tooth less than the one $i$ on the shaft, at every revolution it will fall one tooth behind. If wheel $g$ has nineteen teeth, and the one $i$ twenty, then $g$ must make twenty revolutions around $i$ to make it revolve once. The greater the difference between the number of teeth in $g\ i$ the less the power exerted, and the less the difference the more the power. This wheel is loose on the main shaft, and has a coupling formed upon its side so as to gear with the spool or drum $l$, which has a coupling formed upon each end, and which is shifted back and forth by the lever $n$.

When the spool is in gear with the fixed coupling $o$ secured to the shaft $t$, near the crank $v$, it is used for hoisting light weights, the power being as to the difference between the diameter of the spool and wheel $d$.

When in gear with the wheel $i$ the greatest power is exerted, and when in gear with neither the rope can be run back without affecting the spool. By the above-described arrangement of the various parts I am enabled to use very small wheels, placed very compactly together so as to take up but little space, and yet produce a machine of great power.

Having thus described my invention, what I claim as new, and desire to secure by Letters Patent, is—

1. The combination of the wheels $c\ d\ e\ g\ i$ with the spool or drum, substantially as specified.

2. A hoisting-machine in which the various parts are arranged and combined to operate substantially as shown and described.

In testimony that I claim the foregoing I have hereunto set my hand this 18th day of April, 1873.

SAMUEL REYNOLDS.

Witnesses:
HIRAM ALLEN,
BENJ. P. LARNEL.